(12) United States Patent
Ivanov

(10) Patent No.: US 9,189,093 B2
(45) Date of Patent: Nov. 17, 2015

(54) SYSTEM AND METHOD FOR THE GENERATION OF A SIGNAL CORRELATED WITH A MANUAL INPUT OPERATION

(75) Inventor: Artem Ivanov, Landshut (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 132 days.

(21) Appl. No.: 13/577,539

(22) PCT Filed: Feb. 10, 2011

(86) PCT No.: PCT/EP2011/000639
§ 371 (c)(1),
(2), (4) Date: Mar. 20, 2013

(87) PCT Pub. No.: WO2011/098281
PCT Pub. Date: Aug. 18, 2011

(65) Prior Publication Data
US 2013/0176236 A1    Jul. 11, 2013

(30) Foreign Application Priority Data
Feb. 10, 2010    (DE) .................... 10 2010 007 582

(51) Int. Cl.
*G06F 3/041*    (2006.01)
*G06F 3/044*    (2006.01)
*G06F 3/0488*    (2013.01)

(52) U.S. Cl.
CPC ............ *G06F 3/041* (2013.01); *G06F 3/044* (2013.01); *G06F 3/0488* (2013.01); *G06F 3/04883* (2013.01)

(58) Field of Classification Search
CPC ... G06F 3/044; G06F 3/04883; G06F 3/0488; G06F 2203/04107; G06F 3/041
USPC ............... 345/173–179, 156–157, 168–169; 178/18.01–18.09; 463/37–38
See application file for complete search history.

(56) References Cited

U.S. PATENT DOCUMENTS

| 6,204,839 B1 | 3/2001 | Mato, Jr. ..................... 345/168 |
| 6,680,677 B1 | 1/2004 | Tiphane ........................ 341/22 |

(Continued)

FOREIGN PATENT DOCUMENTS

| CN | 101556783 A | 10/2009 | ............. G02F 1/133 |
| CN | 101557430 A | 10/2009 | ............. G06F 3/041 |

(Continued)

OTHER PUBLICATIONS

International Search Report and Written Opinion, Application No. PCT/EP2011/000639, 14 pages, Jun. 9, 2011.

(Continued)

*Primary Examiner* — MD Saiful A Siddiqui
(74) *Attorney, Agent, or Firm* — Slayden Grubert Beard PLLC

(57) ABSTRACT

In a system, as well as a method for the generation of a signal correlated with a manual input operation, especially a gesture-like input operation is executed by a user with his hands or fingers in front of a physical device and it input signals for signal processing operations are generated which correlate in a particularly reliable and accurate way with manual input operations. A system may have an electrode group integrated into an equipment component, that has several plane shaped electrodes adjacent to each other, and a circuit arrangement coupled to the electrodes of the electrode group, wherein the electrode group and the circuit arrangement constitute a sensor circuit allowing both a detection of a status to evaluate as a physical contacting of the equipment component, and a position detection of the hand or a finger of a user in a area placed spatially upstream of the equipment component.

20 Claims, 12 Drawing Sheets

(56) References Cited

U.S. PATENT DOCUMENTS

| | | |
|---|---|---|
| 7,969,166 B2 | 6/2011 | Fasshauer ............... 324/663 |
| 8,319,737 B2 | 11/2012 | Noguchi et al. ............. 345/173 |
| 8,599,148 B2 | 12/2013 | Chung et al. .................. 345/173 |
| 8,786,557 B2 | 7/2014 | Noguchi et al. .............. 345/173 |
| 2005/0046621 A1* | 3/2005 | Kaikuranta ............... 345/173 |
| 2006/0033508 A1* | 2/2006 | Lee ............... 324/678 |
| 2006/0232567 A1 | 10/2006 | Westerman et al. ........... 345/173 |
| 2006/0244733 A1* | 11/2006 | Geaghan ............... 345/173 |
| 2008/0042978 A1 | 2/2008 | Perez-noguera ............ 345/168 |
| 2008/0127739 A1* | 6/2008 | DeAngelis et al. ............ 73/718 |
| 2008/0168403 A1 | 7/2008 | Westerman et al. .......... 715/863 |
| 2008/0266271 A1 | 10/2008 | Van Berkel et al. .......... 345/174 |
| 2009/0201266 A1 | 8/2009 | Hashimoto et al. ........... 345/173 |
| 2009/0225055 A1* | 9/2009 | Oki ............... 345/173 |
| 2009/0256814 A1* | 10/2009 | Chung et al. ................. 345/173 |
| 2009/0284495 A1* | 11/2009 | Geaghan et al. ............ 345/174 |
| 2009/0284496 A1* | 11/2009 | Oki ............... 345/174 |
| 2009/0289907 A1* | 11/2009 | Ruscher et al. ............. 345/173 |
| 2009/0295753 A1* | 12/2009 | King et al. ............... 345/174 |
| 2009/0315841 A1 | 12/2009 | Cheng et al. ............. 345/173 |
| 2010/0026656 A1* | 2/2010 | Hotelling et al. ............ 345/174 |
| 2010/0102941 A1* | 4/2010 | Richter et al. ............ 340/407.2 |
| 2010/0134422 A1* | 6/2010 | Borras ............... 345/173 |
| 2010/0156838 A1* | 6/2010 | Han ............... 345/174 |
| 2010/0182273 A1 | 7/2010 | Noguchi et al. ............. 345/174 |
| 2010/0258361 A1 | 10/2010 | Yamauchi et al. ......... 178/18.06 |
| 2010/0321311 A1* | 12/2010 | Chang et al. .................. 345/173 |
| 2011/0022393 A1 | 1/2011 | Wäller et al. .................. 704/270 |
| 2011/0164029 A1* | 7/2011 | King et al. ............... 345/419 |

FOREIGN PATENT DOCUMENTS

| | | | |
|---|---|---|---|
| DE | 102005038678 A1 | 2/2007 | ........... H03K 17/955 |
| DE | 102007054239 A1 | 5/2009 | ............ B60K 35/00 |
| DE | 102008051757 A1 | 5/2009 | ............ B60R 16/02 |
| JP | 2008502072 A | 1/2008 | ............ G06F 3/041 |
| JP | 2009098834 A | 5/2009 | ........... G02F 1/1345 |
| JP | 2009169697 A | 7/2009 | ............ G06F 3/041 |
| JP | 2009183592 A | 8/2009 | ............... A61B 8/00 |
| JP | 2009244958 A | 10/2009 | ............... G02F 1/13 |
| TW | 201001010 A1 | 1/2010 | ............ G02F 1/133 |
| WO | 95/27334 A1 | 10/1995 | ............ G06F 3/02 |
| WO | 2005/055028 A2 | 6/2005 | ............ G06F 3/02 |
| WO | 2007/048640 A1 | 5/2007 | ........... H03K 17/955 |
| WO | 2008/085418 A2 | 7/2008 | ............ G06F 3/041 |
| WO | WO2008/116642 A2 * | 10/2008 | |
| WO | 2011/098281 A2 | 8/2011 | ............... G06F 3/01 |

OTHER PUBLICATIONS

Japanese Office Action, Application No. 2012-552312, 10 pages, Jan. 23, 2015.

* cited by examiner

SYSTEM AND METHOD FOR THE GENERATION OF A SIGNAL CORRELATED WITH A MANUAL INPUT OPERATION

CROSS-REFERENCE TO RELATED APPLICATIONS

This application is a U.S. National Stage application of International Application No. PCT/EP2011/000639 filed Feb. 10, 2011, which designates the United States of America, and claims priority to German Application No. 10 2010 007 582.5 filed Feb. 10, 2010, the contents of which are hereby incorporated by reference in their entirety.

TECHNICAL FIELD

The invention relates to a system, as well as a method for the generation of a signal correlated with a manual, especially gesture-like input operation executed by a user with his hands or fingers relative to a physical device, in which this signal is used for the control of an electronic device, especially of a computer system provided for using a user program.

SUMMARY

According to various embodiments, it is possible to generate input signals for signal processing operations, especially as control signals for user program interactions, which correlates particularly reliably and accurately with manual, especially gesture-like input operations executed by the user.

According to various embodiments, a system for generating input signals correlating as such with manual input operations executed by the user, may comprise an electrode group integrated into a equipment component comprising several flat shaped electrodes adjacent to each other, and a circuit arrangement coupled with the electrodes of the electrode group, wherein the electrode group and the circuit arrangement constitute a sensor circuit which both allows a detection of a status to evaluate as physical contacting of the equipment component, and also a position detection of the hand or a finger of a user in a area which is spatially located in front of the equipment component.

According to a further embodiment, the position detection primary can be accomplished by means of an electrode subgroup contained in the electrode group comprising several subelectrodes spaced one from the others. According to a further embodiment, the electrode group can be configured in such a way that it substantially covers in its totality the full surface area serving as touch detection zone surface. According to a further embodiment, the electrode group may comprise a main electrode and those subelectrodes. According to a further embodiment, the total area of the subelectrodes can be smaller than the total area of the main electrode or the subelectrodes each time have one smaller electrode surface as the main electrode, or that the subelectrodes can be arranged in the edge zone of the detection zone, and/or the subelectrodes can be strip-like electrode structures extend along the edge of the detection zone. According to a further embodiment, the detection zone may comprise edge zones, and that the subelectrodes are arranged in these edge areas. According to a further embodiment, the subelectrodes can be arranged in an area embraced by the main electrode, and/or the detection zone may represent a substantially rectangular area, and/or the electrode subgroup substantially may be configured rotation symmetrical in the detection zone. According to a further embodiment, the electrode subgroup may comprise four subelectrodes and the position of the subelectrodes can be fixed so that the surface centres of gravity of the subelectrodes represent the edges of a rectangle, a rhombus, or a square. According to a further embodiment, a carrier electrode can be provided that extends on one lower side of the electrode relative to the detection zone below the electrode group. According to a further embodiment, this carrier electrode can be connected to the circuit arrangement, and this carrier electrode can be operated as shielding electrode for the extensive shielding of the lower part of the electrode group. According to a further embodiment, at least one of the electrodes can be transparent, especially designed as an ITO layer electrode.

According to yet another embodiment, in a method for generating input signals correlating as such with manual input operations executed by the user, by means of an electrode group integrated into a equipment component comprising several plane shaped electrodes adjacent to each other, takes place both a detection of a status to evaluate as a physical contacting of the equipment component, and a position detection in an area placed spatially in front of the equipment component, wherein the touch detection takes place according to a detection criterion, that is applied on the signals, or values derived thereof which are determined or generated within the scope of the position detection.

According to a further embodiment, the detection criterion can be a dynamic criterion concerning the occurrence of characteristics over the time response of the indicative signal contribution relative to the position of the Z-axis. According to a further embodiment of the method, this detection criterion may comprise an observation of a detected position of the Z-axis, and that a contact is detected, when a certain distance to the equipment component appears as to be below. According to a further embodiment of the method, in the case of a contact a two-dimensional detection of the movement of a finger and a spatial detection of a finger or a hand of a user is made possible, wherein the function of a computer system connected to the display device can be coordinated by gesture-like inputs, which are executed in front of the display device.

According to yet another embodiment, a computer monitor may comprise a display and a keyboard equipment, in which both in the display, and in the keyboard equipment is integrated a detection means allowing in a field-electrical way a spatial detection of a finger or a hand of a user, wherein the device function can be coordinated by gesture-like inputs that are executed in front of the display and in front of the keyboard equipment.

BRIEF DESCRIPTION OF THE DRAWINGS

Further particulars and features of the various embodiments result from the following description in connection with the drawings, wherein the figures show.

DETAILED DESCRIPTION

Figure 1:
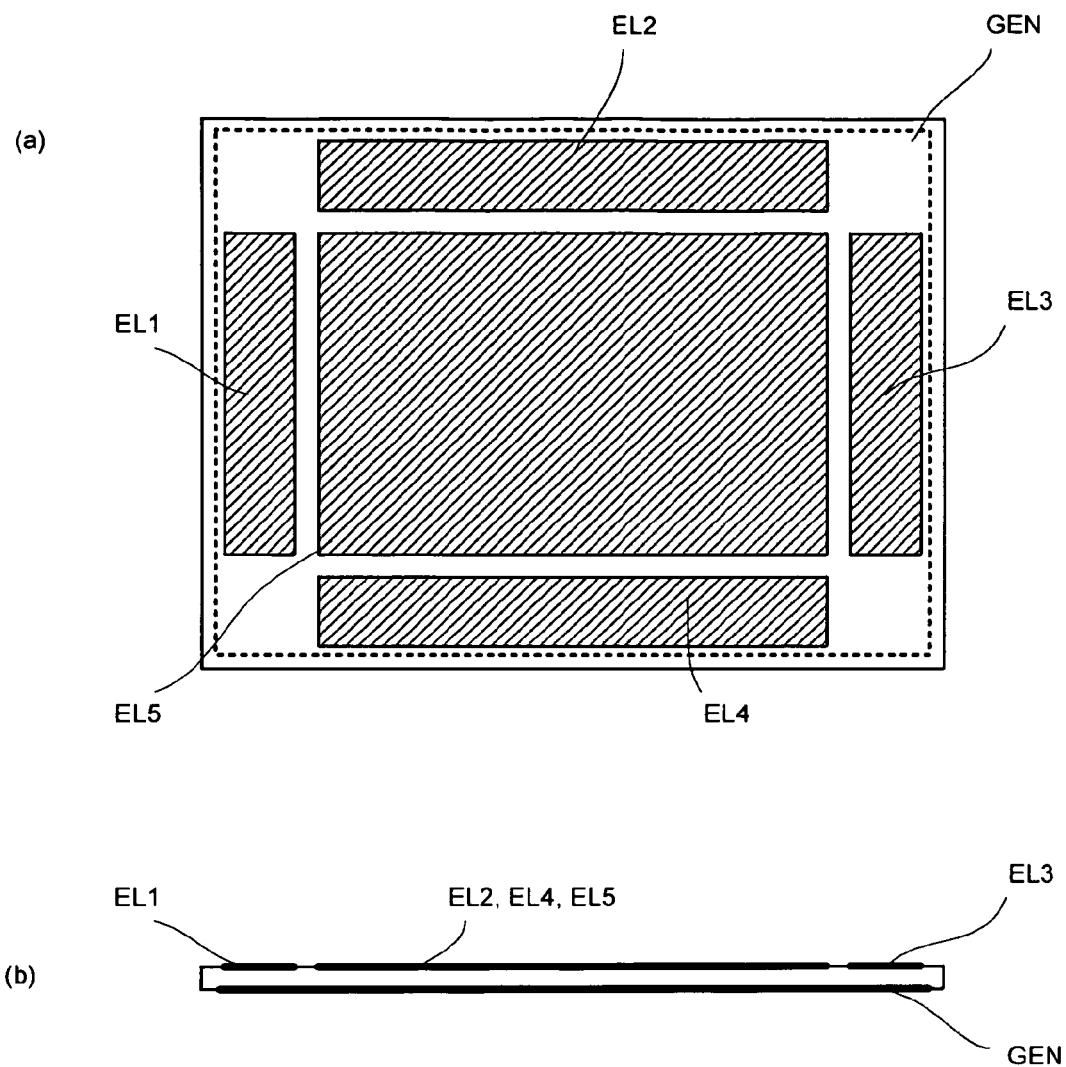
FIG. 1 a schematic representation to illustrate the structure of an electrode group in a system according to various embodiments for the combined gesture and contact detection.

According to one embodiment, a system for generating input signals, that correlates as such with manual input operations executed by the user, may comprise:
- an electrode group integrated into an equipment component comprising several flat shaped and adjacent electrodes, and
- a circuit arrangement coupled with the electrodes of the electrode group,
- wherein the electrode group and the circuit arrangement constitute a sensor circuit allowing both a detection of a status of a physical contact of the equipment component, and a detection of the position of the hand or a finger of a user in an area spatially located above the equipment component.

Thus it is advantageously possible to create an input interface for manual input operations coordinated by the user, which allows to reliably distinguish between a free spatial movement of a finger and the physical contact of a structure, which accommodates the electrode arrangement. In a particularly advantageous mode it is possible to handle in this way gestures, as well as cursor control and selection processes, which are concluded or validated with a contact process, or contain one or several brief contact phases. The various embodiments are suitable in a particular extent for the implementation of a "hidden interface", by which in the case of electronic equipments with usual design attributes can be offered an intuitively well controllable additional function. The various embodiments are suitable especially for the use in the case of distinct plane shaped equipment components, especially displays, housings, user panels and especially also computer keyboards.

According to a particular aspect, the position detection primary is accomplished by means of an electrode subgroup contained in the electrode group that comprises several subelectrodes spaced from each other.

The individual electrodes are outlined preferably in such a way that the totality of the electrodes represents an area closed to a large extent. The electric connection of these electrodes to the circuit arrangement can be accomplished in such a way that the touch detection takes place by electric effects, which act primary on an electrode of the electrode group and in doing so it is detected by means of this electrode. This electrode can be configured in such a way, that it represents the largest electrode in size. This electrode can be configured in such a way, that it extents substantially on the same area as the position detection electrodes. This electrode provided for detecting the touch can be arranged also in front, or preferably behind the position detection electrodes.

The detection of the touch can take place for example by the electrode determining the existence of a significant capacitive coupling of the electrode with the user. Preferably the electrode is covered with an insulator, so that no galvanic contact of the electrode occurs. However embodiments are also possible, in which this electrode serving for the touch detection can be galvanically contacted by the user.

Besides the detection of a touch status on the basis of a significant signal level it is also possible to determine the touch detection on the basis of dynamic features of the influences acting on the electrode. So for example a pronounced stagnancy of a voltage level applied on the electrode can be used, or a stagnancy of the capacitance of a capacitive system constituted under inclusion of that electrode can be used on a certain level as circumstantial evidence, that a status to be classified as contact may be given. The evaluation of a approximation status of the finger or the hand of an user to the system according to various embodiments, as touch status, can also take place by several combined processing criteria, especially of the absolute signal level, the derivative with respect to the time response of the signal level, as well as where applicable also the results of triangulation. As a triangulation result that is indicative for a contact can be effective for example a triangulation result, whose calculated individual distances to the position detection electrodes reveal that the detected object lies at least relatively near to the level defined by the position detection electrodes.

The electrode group according to various embodiments can be configured to a great extent symmetrically relative to the shape of the individual electrodes as well as the management of each of them towards the other. Such concepts are especially suitable for one-hand input systems. It is also possible to configure the electrode group according to various embodiments in such a way, that it can be accomplished by means of a two-hand input. For such applications the electrode group can be configured in such a way that one zone of the same is intended for the particularly precise position detection for this purpose in an advantageous area of the corresponding device, and the remaining area is substantially intended for the touch detection. In the case of the integration of the system into a computer keyboard according to various embodiments, a particularly precise information about X-, Y-axis, and preferably about Z-axis can be also determined e.g. in the range of number pads, whereas in the key pad area assigned to the left hand those touch detection substantially is laid-out on the detection by the second hand of a contact of a physical component of the keyboard.

It is possible to gauge the system continuously, being processed for example the position information determined in the case of contact accordingly with the signals detected before the hand is within the scope of the approximation, i.e. still before the contact.

It is moreover possible to design and to connect the circuit arrangement and the electrodes in such a way, that the function of the electrodes, as primary position detection electrodes or touch detection electrodes, can be determined on the base of the memory. It is also possible to dynamically adjust the function of the electrodes. So, for each approximation status for the position detection can be used an electrode group allowing a particularly reliable triangulation.

Preferably the electrode group is configured in such a way, that it comprises a main electrode and those subelectrodes. The subelectrodes preferably are configured in such a way, that these each time have one smaller electrode surface as the main electrode. The subelectrodes can be designed especially with a small surface, so that the total area of the subelectrodes is smaller than the total area of the main electrode.

Especially in a configuration of the electrode group as a rectangular electrode system it is possible to arrange the subelectrodes in the edge area of the detection zone. The subelectrodes can be arranged in such a way, that these each time constitute an electrode pair that lies in front of the surface of the rectangle with respect to the centre. So it is possible to obtain by means of a left and a right subelectrode relatively precise data about the X-axis and to obtain by means of the lower and the upper electrode relatively precise data about the Y-axis. From the totality of this information it can then be determined the information about the Z-axis with a certain accordance and further approximation appraisals.

Alternatively to the type of the subelectrodes as relatively long extended electrodes and electrodes extending along the edge area of the detection zone it is also possible to place the subelectrodes, as relatively small, stout built electrodes, in the corresponding edge areas of the detection zone.

The preceding described arrangement of the subelectrodes close to the border, or electrodes arranged in the edge area is especially suitable in the case of use of the technique according to various embodiments in association with touch pad display systems.

According to further embodiments it is also possible to arrange the subelectrodes in an area embraced by the main electrode. The subelectrodes in this respect can be designed as an electrode group substantially close to the centre, or they can be arranged alternatively also in such a way, that their surface centre of gravity lie relatively close to the surface centre of gravity of an assigned quadrant or segment of the touch detection zone.

The electrode arrangement is preferably configured in such a way, that the detection zone represents a substantially rectangular area. The electrode subgroup in this respect is configured preferably basically rotation symmetrical or even point-symmetrical in the detection zone.

According to a further embodiment the electrode subgroup is configured in such a way, that it comprises four subelectrodes, and that the position of the subelectrodes is fixed in such a way, that the surface centre of gravity of the subelectrodes represent the edges of a rectangle, a rhombus, or a square.

It is possible to fit the system according to various embodiments with a carrier electrode extending on one lower side of the electrode faced away from the detection zone below the electrode group. By means of this carrier electrode can be achieved a rearward shield. The carrier electrode can be connected to the circuit arrangement or another driver circuit in such a way, that this carrier electrode is operated as shield electrode, for the extensive shielding of the lower side of the electrode group. The carrier electrode can also be used even for the touch detection (compare FIG. 15, 16).

By means of the concept according to various embodiments it is possible to create an electronic device, that can be integrated into a device, in order to detect the position and the movement of limbs, especially the finger of the user in a spatial area in front of the device and to determine at the same time if the user touches the surface of the device. The various embodiments create a new communication channel between the user and the device operated by the same, which combines the freedom of the gesture control as well as the clearness of the operation based on the contact. The concept according to various embodiments can be realized with an economic and extremely compact hardware. The circuit arrangement can be realized where applicable by a single ASIC (Application-specific integrated circuit). Alternatively the circuit according to various embodiments can be implemented discretely also with commercially available components still in a relatively place saving way.

The various embodiments can create a bridge between control concepts based on contacts and based on gestures without contact and allows integrating the technology into diffused computer applications (and similar). The various embodiments pave the way and back up the acceptance for, or from controls based on gestures.

According to various embodiments, besides the system here indicated consisting of the particular electrode arrangement and the assigned circuit arrangement also a method for the provision of signals can be provided, which, within the scope of approximation processes, both includes extracted site information and touch information generated in case of contact of a equipment component.

FIG. 1 shows the structure of the electrode group for a system according to various embodiments for generating input signals correlating as such with manual input operations executed by the user.

The electrode group includes several plane shaped electrodes adjacent to each other EL1, EL2, EL3, EL4 and EL5. These electrodes EL1, EL2, EL3, EL4 and EL5 are connected to a circuit arrangement which is explained more in detail in the following in conjunction with the FIG. 2.

The electrode group defines in its totality a detection zone which both allows a spatial detection of limbs, especially a finger of the user, as well as a detection of an approximation status to evaluate a contact. The circuit arrangement connected to the electrodes EL1, EL2, EL3, EL4 and EL5 is configured in such a way, that via the electrode group EL1, EL2, EL3, EL4 and EL5 both a touch detection and a position detection are obtained, wherein the position detection primary is executed by means of an electrode subgroup contained in the electrode group EL1, EL2, EL3, EL4 and EL5, that comprises several subelectrodes spaced from each other EL1, EL2, EL3, EL4.

The system can be configured in such a way, that moving objects (fingers, hands . . . ) which are situated relatively far over the electrodes, a presence detection or a slightly rougher position detection primary occurs, that offers a limited spectrum of the interaction options. So for example, after a longer fail of keyboard entries a screensaver mode can be disabled, when in a relatively wide spaced area the presence of the hands of the user is still recognized in front of a keyboard. In the case of detection of the presence of limbs, especially the hands of the user in a wider spaced area also certain user and gesture interpretation modes can be activated. So for example, in the case of removing the hands from a keyboard or a display screen of about 30 cm a corresponding computer can be switched into a "full screen mode", in which no toolbars or vast control panels are visualised. In this full screen mode, few tendential rough motoric gestures can be recognized, e.g. a hint with the flat hand as "page-turning gesture" or "back page gesture" and a corresponding image reproduction can be initiated.

In the case of using the various embodiments in a keyboard and at the same time in a display screen, an input mode via screen can, for example, be prevented, when a sufficient approximation to the keyboard takes place. The system according to various embodiments can also be used in a computer, that, for example, by approximation with the finger of the right hand to a display screen a cursor can be navigated on this display screen. By spatial gestures or finger movements of the left hand relatively to the keyboard then certain functions can be coordinated like selections and scales. Concretely, e.g., with the finger of the right hand an image can be selected from the image preview with numerous images arranged in lines and columns. By enlarging the distance between the thumb and the index finger of the left hand near the left edge of a keyboard according to various embodiments, the selected image can be amplified "zoomed" and diminished again. Also the drag and drop actions can be coordinated with this combi-system in an intuitive and particularly good controllable way.

In the example of the embodiment shown here the electrode group EL1, EL2, EL3, EL4 and EL5 comprise a main electrode GEN and those subelectrodes EL1, EL2, EL3, EL4, EL5. The subelectrodes EL1, EL2, EL3, EL4, EL5 have each time one smaller electrode surface as the main electrode GEN. The subelectrodes EL1, EL2, EL3, EL4 especially can be configured in such a way, that their total area is smaller than the effective total area of the main electrode GEN.

The subelectrodes EL1, EL2, EL3, EL4 are arranged as can be seen in the edge zone of the detection zone. The subelectrodes EL1, EL2, EL3, EL4 extend as small rectangular strips along the edge of the detection zone.

On the lower side, i.e. the rear side of the electrode group opposite to the input area is situated a generator electrode GEN stressed by the voltage with the generator signal.

In the exemplary embodiment of the electrode arrangement shown in the FIG. 1 the latter comprises, as already mentioned, four strip shaped subelectrodes serving as position detection electrodes EL1, EL2, EL3, EL4 and a centrally arranged touch detection electrode EL5. (the number of the electrodes can be smaller or greater depending also on the application). The generator electrode GEN in this exemplary embodiment is placed below all measuring electrodes. The electrodes are arranged in a structure of two layers with an insulating layer between. The electrode arrangement in this respect can be realized e.g. on a two-layer printed circuit (see lower representation of Fig.).

A distinguishing feature of the lower arrangement, which allows the touch detection, is to manufacture the large electrode EL5 such that it fills the surface not occupied by the electrodes EL1 to EL4. The touch-sensitive area therewith extends over the electrodes EL1 to EL5.

In FIGS. 2, 11, 12, and 14 the electronic circuits for the assigned electrode arrangements are illustrated schematically. As it can be seen in FIG. 2, the electrodes are connected to the inputs of the gesture IC/of the gesture circuit. CH1 to CH5 are although the (same) channels of the circuit.

The measuring circuit presents highly resistive inputs. Therefore the electrode EL5 does not interfere with the function of the position detection electrodes EL1 to EL4. The electrode EL5 has a strong capacitive coupling to the generator electrode GEN and a similar electric potential. For this reason the range of the measuring device is not affected by the introduction of the electrode EL5, this applies also for the electrode arrangements according to the FIGS. 7 and 8. In this case the range even is increased by the effect of the electrode EL5.

Figure 3:
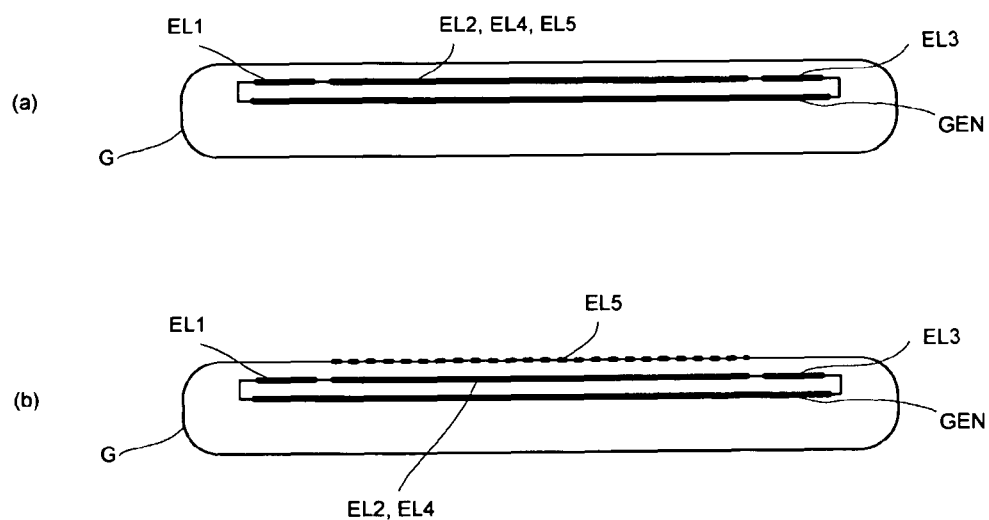
FIG. 3 a schematic representation to illustrate two further variants of the configuration of the electrode arrangement.

The two exemplary embodiments shown in the FIG. 3 show two of the possibilities for the disposition of the touch detection electrode EL5. The embodiment according to the FIG. 3a corresponds to the embodiment according to FIG. 1b. In the exemplary embodiment according to the FIG. 3b the touch detection electrode EL5 extends in a level, that is displaced to the electrode level defined by the electrodes EL1, EL2, EL3 and EL4. The touch detection electrode EL5 can be situated directly below the structure of a housing or a top layer of a display.

Especially the touch detection electrode EL5 can be executed as an extensive transparent electrode. This transparent effect can be obtained in that the touch detection electrode EL5 being either executed sufficiently thin, for example as a vacuum metallizing or chemically deposited metallic layer or e.g. an ITO layer, as a layer of a conductive plastic material, or as a fine-webbed lattice structure.

In a full-surface cover of the electrodes serving as position detection electrodes EL1, EL2, EL3, EL4 it is possible to provide recesses in the touch detection electrode, or to develop lower segments, which can be decoupled from time to time by the circuit arrangement, in order to not damage the field generation.

In FIG. 3 are illustrated examples of the integration of this electrode arrangement into the housing G of the device. The partial frame (a) shows a variant, in which all the electrodes are situated inside a housing. In the partial frame (b) the electrode EL5 is placed on the surface of the housing. In this case the signal change in the case of a contact is the greatest and thus significantly dominant.

Figure 4:
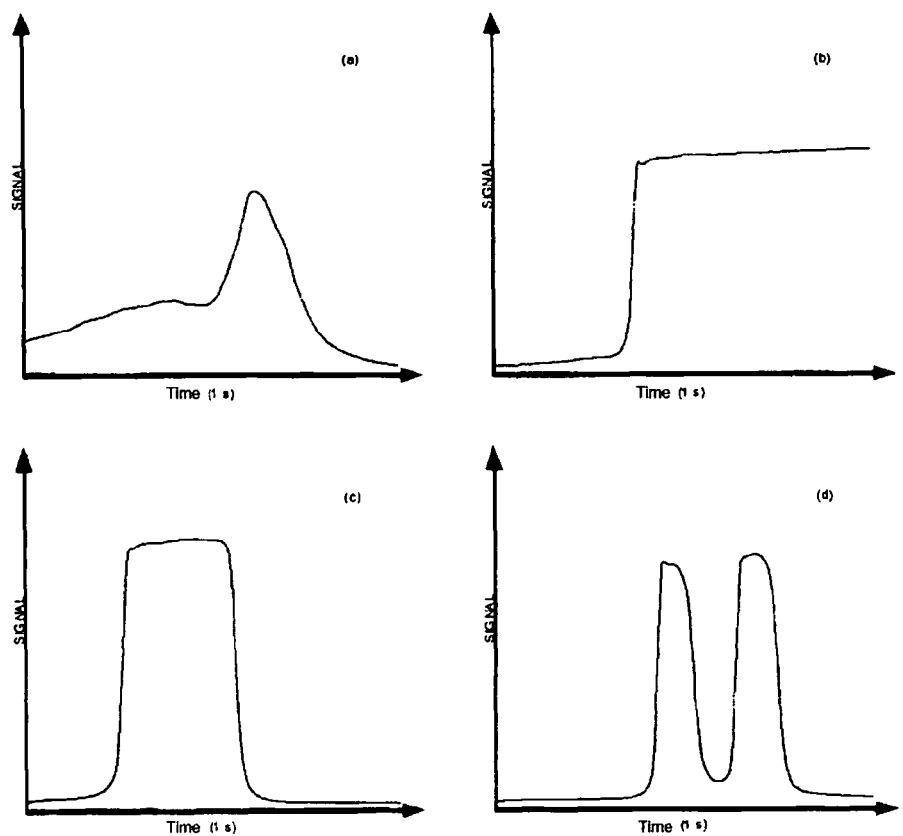
FIG. 4 a chart diagram to illustrate the time response of signal levels for the motional and contact processes.

In FIG. 4 are illustrated the indexes of refraction of the input signals scanned by the electrodes by means of the system according to various embodiments. The electrodes are covered with a plastic spacer (here the thickness d=6 mm), so that the finger of a user cannot touch directly the corresponding electrodes. The configuration of the electrode arrangement based on this measurement corresponds to the disposition according to the FIG. 3a. The shown signal is the signal scanned only by one electrode. The represented time lapse continuously amounts to 1 second. The individual partial frames represent:

(a) a particularly fast movement of the hand near to the electrode arrangement without contact (further denominated as "Gesture");
(b) approximation of a finger to an electrode up to the spacer and further resting on it ("touch and rest");
(c) a contact of the spacer with the finger with the following lifting-off of the finger, equivalently to a push of a button ("click event");
(d) a double touch of the spacer with the finger ("double click event").

With the concept according to various embodiments it is possible to detect gestures and touches of the user with high definition and to reliably distinguish in this respect between the gestures and touches of the user. As it can be seen in FIG. 4, it is possible to certainly discriminate a differentiation between movements of the type "Gesture" and the types "touch and rest", "click event" and "double click event" even when using an electrically insulating spacer, i.e. of a case, or a cover (e.g. display screen). (When the electrode EL5 lies on the surface of the device, the distinction however is still sharper.) The differentiation takes place with the help of the features of the signal amplitude (it corresponds to the proximity to the device) and the signal derivation thus the signal dynamics (corresponds to the speed of the movement).

It is characteristic for the "touch" and "click" movements, that the temporal variation of the signal at the arrival of the finger experiences a strong change on the surface of the case, precisely from a high value to a value of at least nearly zero (the surface is reached, no further movement possible, the finger becomes quiet). In the case of a "click" and "double click events" follows a fast change, where applicable, a significant double change in a narrow temporal sequence of the signal amplitude, that is characterised by a great negative value of the signal derivation.

Figure 5:
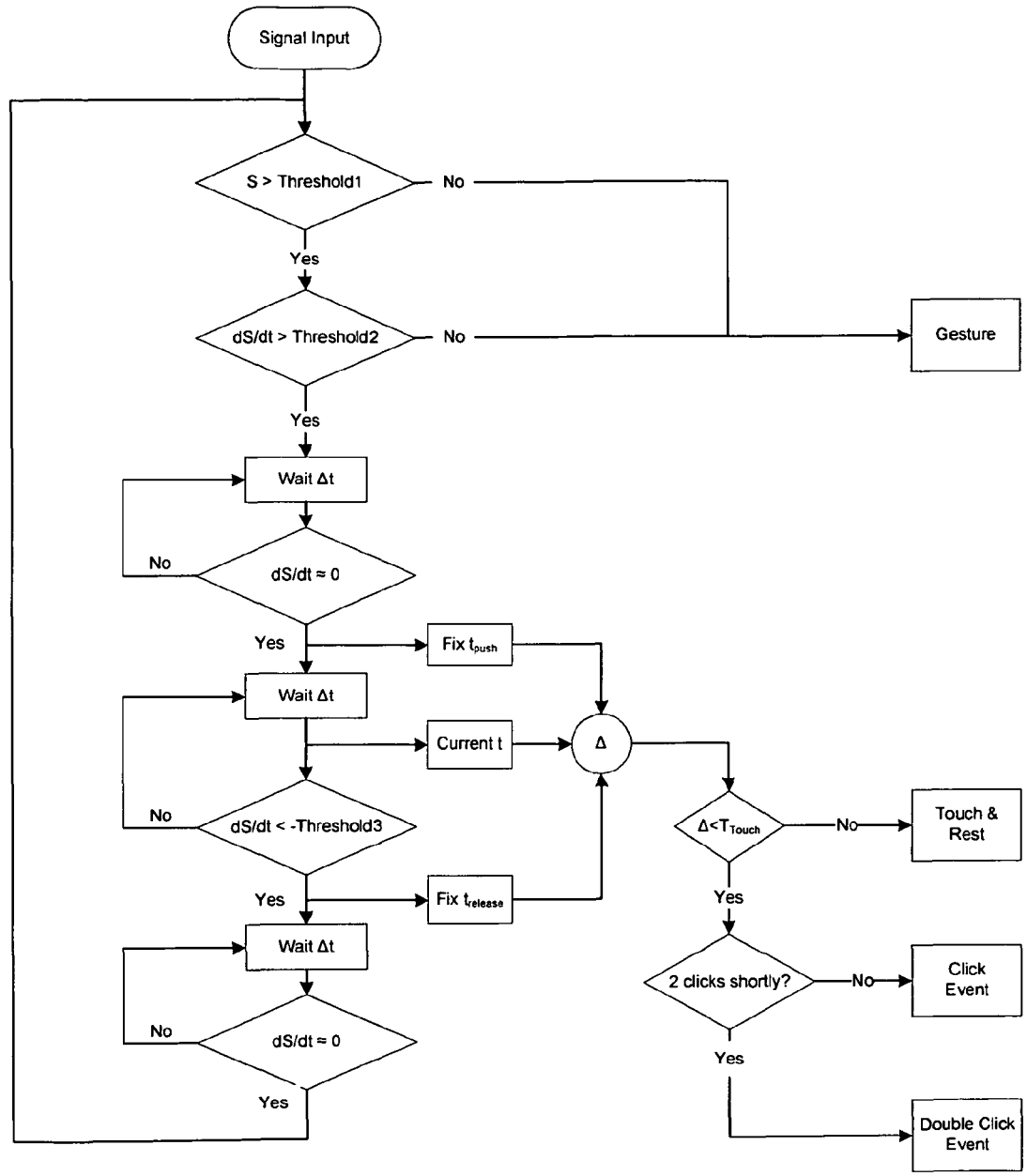
FIG. 5 a flowchart to illustrate a preferred variant of the signal processing according to various embodiments.

In FIG. 5 is shown a possible algorithm of the differentiation. This processes, as input parameter, the amplitude of the signal S, the derivative with respect to time of the signal dS/dt and the temporal difference A between the determined events.

The signals of the electronic gestures have a strong non-linearity (as the square and cubic dependence from the distance): the closer a finger, or a other action relevant object lies in a electrode, the greater is the absolute change of the signal in an equal distance change. This attitude increases the security of the determination of the contact, because also a slower approximation to the housing of the device means a great value of the signal derivation.

It could be detected experimentally, that it is not possible for a human to hold the finger very near to the surface of the housing (large signal amplitude and high sensitivity for the smallest movements) in such a way, that this extraordinary and status of untypical use could be confound with the contact and rest on the surface.

Unlike the fast movements from FIG. 4 (a) the signal for the movement of the finger in the normal speed has clearly slower rise and fall times and is still less similar to a "click event".

Figure 6:
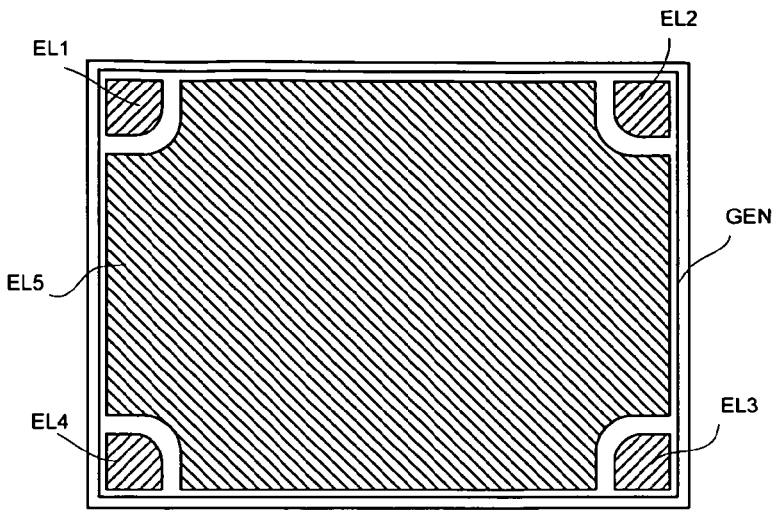
FIGS. 6 to 9 further schematic representations to illustrate the structure of a further variant of electrode groups according to various embodiments in a system according to the invention for the combined detection of gestures and contact.

In FIG. 6 another configuration of electrodes is shown, in which the position detection electrodes EL1, EL2, EL3, EL4 though are arranged similar to the exemplary embodiment according to FIG. 1a in the external edge zone of the touch detection zone, but not as thin strips, but rather as compact, stocky edge electrodes are executed. These special edge electrodes have smaller sizes and lies in the edges of the detection area. The touch detection electrode EL5 fills the area between the electrodes EL1, EL2, EL3, EL4.

Figure 7:
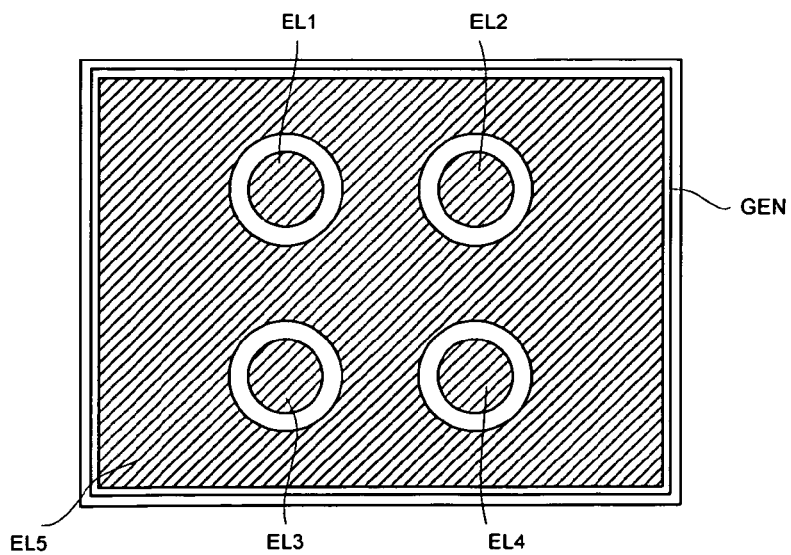

FIG. 7 shows a variant in which the position detection electrodes EL1, EL2, EL3, EL4 lie in the detection area, and are surrounded by the touch detection electrode EL5. The position detection electrodes EL1, EL2, EL3, EL4 are configured as coin size circular disks. Between these position detection electrodes EL1, EL2, EL3, EL4 and the touch detection electrode EL5 are shaped relatively wide annular free zones.

Figure 8:
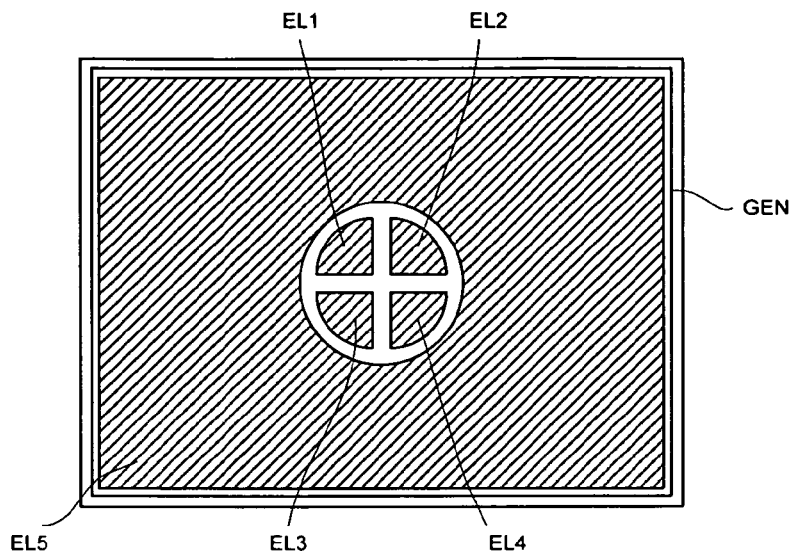

FIG. 8 shows a variant in which the position detection electrodes EL1, EL2, EL3, EL4 are executed extremely compact and placed in the middle of the detection area. The touch detection electrode EL5 defines the detection area for the contact. The detection range for determining the position is greater.

The geometries of the electrodes described above are exemplary types. Also other geometries are possible, that can differ especially in the shape and its relative positions of the electrodes. It is also possible using instead of the EL5 the generator electrode, as it is described below.

The number of the electrodes can be varied according to the application. The number of the position detection electrodes can vary from 1 (mere approximation detection) to e.g. 8 or in special cases also more. Also the number of the touch detection electrodes can vary. So e.g. the detection area can be divided in three lower zones with three touch detection electrodes.

The connection of the electrodes to the gesture electronics denominated in the following as evaluation circuit can take place by conducting paths, preferably shielded conducting paths, here not represented more in detail. Such connections can be executed in a additional layer of printed circuits or in the case of the two-layer printed circuit exemplary illustrated in FIG. 9 (for the electrode configuration of FIG. 8). The touch detection electrode and the generator of this electrode can be provided with cuts, a particularly high signal quality being obtained, if these cuts as well as the conducting paths of the connection of the electrodes preferably are a relative small portion of the electrode surface.

Figure 9:
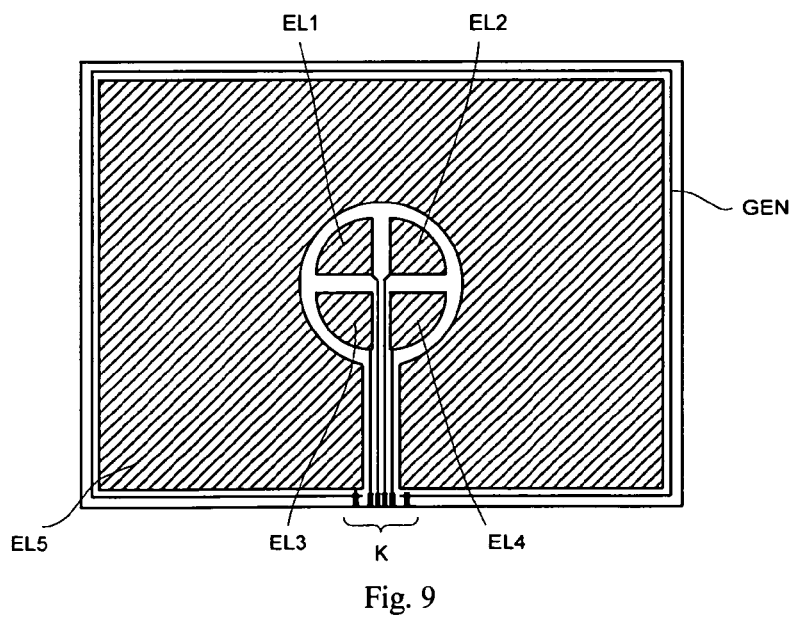

In FIG. 9 is illustrated a variant, in which besides the electrodes also the conducting paths of the connection and whose possible contacting K can be recognized. It is possible to design this structure of the electrode as a widely transparent structure that can be arranged at least nearly invisible directly on a display. The touch detection electrode for this purpose can be executed as a extremely thin metallic layer, or as a ITO layer, or as a web/grid.

In the aforementioned description it was assumed that the touch detection electrode is connected to one of the inputs of the gesture electronics. This input has not to be specially designed for this purpose. On the base of the concept according to various embodiments it is also possible to detect the capacitive load of the generator electrode by means of a corresponding modification of the electronics and to derive on this basis an indicative signal for a touch status.

Figure 10:
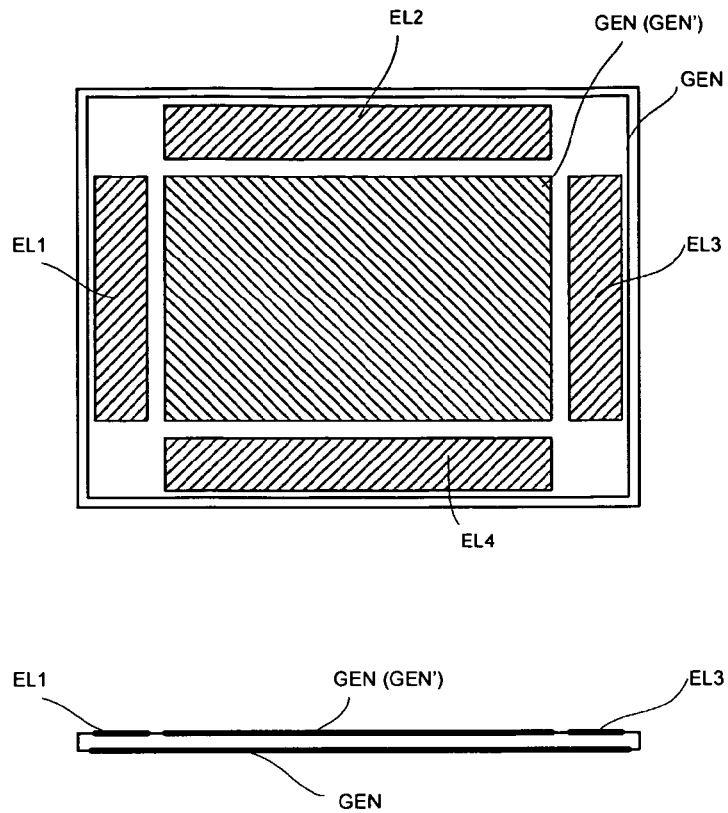
FIGS. 10 to 12 and 15, 16 sketches for deepened explanation of the concept according to various embodiments of the combined contact detection.
Figure 11:
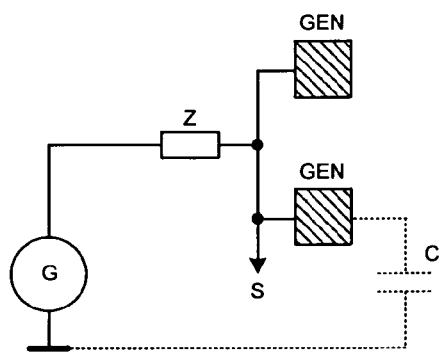
Figure 12:
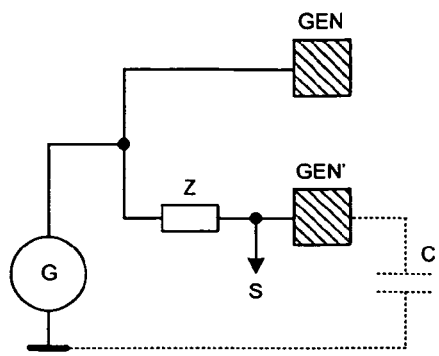

This approach is shown in FIGS. 10 and 11. As it can be seen in FIG. 10 the generator electrode GEN acts as a touch detection electrode (see also the FIG. 1). The touch detection is effected by measuring the capacitive load C of the generator electrode GEN. This load C e.g. can take place by measuring the voltage drop at a connection impedance Z, that is connected between the generator G and the generator electrode GEN (schematically illustrated as signal S in the FIG. 11). This method of the detection of the touch thereby can be advantageous, as this can be implemented in certain applications with a minor expenditure in electrodes. t is also possible to use also a decided sensing electrode for the load capacitance C (which is designated e.g. as GEN' in the FIG. 10). Then such an electrode GEN' is connected to the generator G, e.g. like the drawing in the FIG. 12.

Even if the touch detection electrode (or the generator electrode), as illustrated in FIG. 10, is placed in the middle of the detection area and is executed transparent (as coating or web) such an electrode configuration can accommodate a display behind itself. Then both the gesture and touch control are possible on the display.

Figure 13:
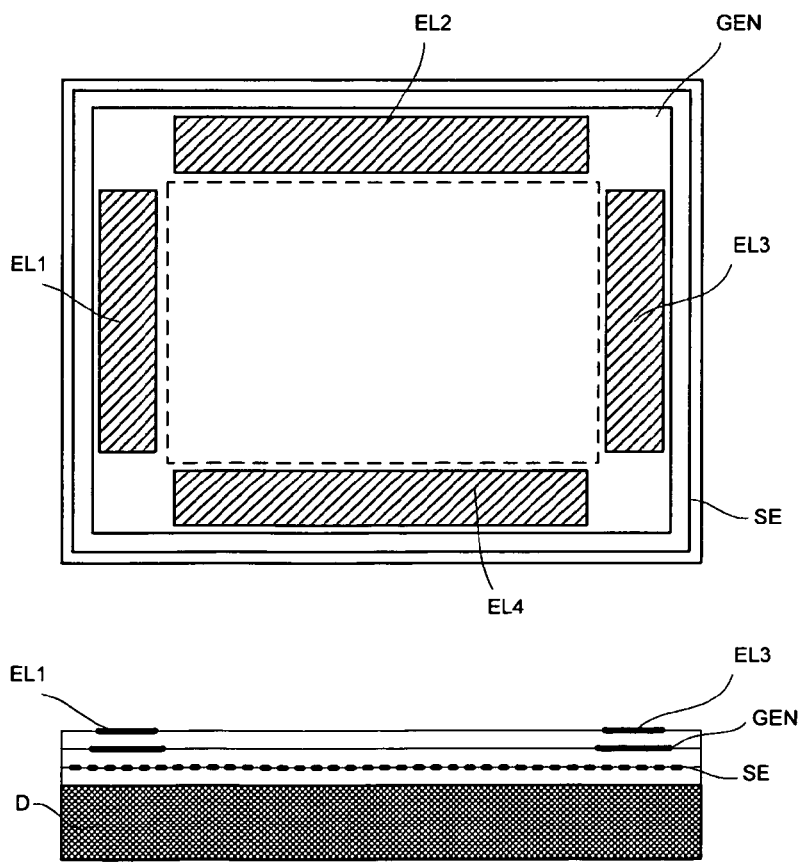
FIGS. 13 and 14 sketches for the explanation of the concept according to various embodiments for the use in connection with display devices.

An electrode configuration particularly advantageous for the structure around a display is shown in FIG. 13. In this configuration the generator electrode GEN is executed as frame below the position detection electrodes EL1, EL2, EL3, EL4 and it must not be transparent, in order to not cover the subjacent display D. The shield of EL1 to EL4 of the display and the touch detection is carried out by the transparent electrode SE that is situated in a layer between the generator electrode GEN and the display D.

Figure 14:
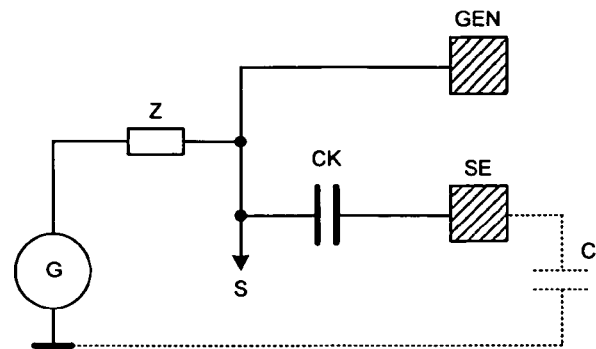

When the generator electrode GEN is sensitive for the change of capacitance, the shielding electrode SE must not be connected galvanically, since its capacitive coupling CK to the generator electrode GEN is sufficient for the function (FIG. 14).

Figure 2:
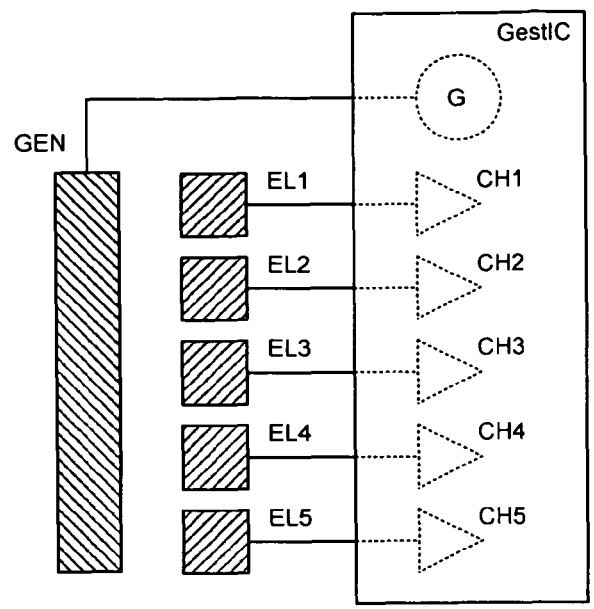
FIG. 2 a schematic representation to illustrate the circuitry connection of the electrode group according to the FIG. 1 to a circuit arrangement executed as ASIC.

It is possible to connect also the electrode SE instead of the touch detection electrode EL5 (compare FIG. 2). There it will ensure also the necessary shield of the electrodes from the display.

It is also possible to use the same electrode assemblies as shown in the FIGS. 6, 7 and 8 for the system with capacitance sensitive generator electrode. Only the description EL5 on GEN/GEN' must be changed for it.

Figure 15:
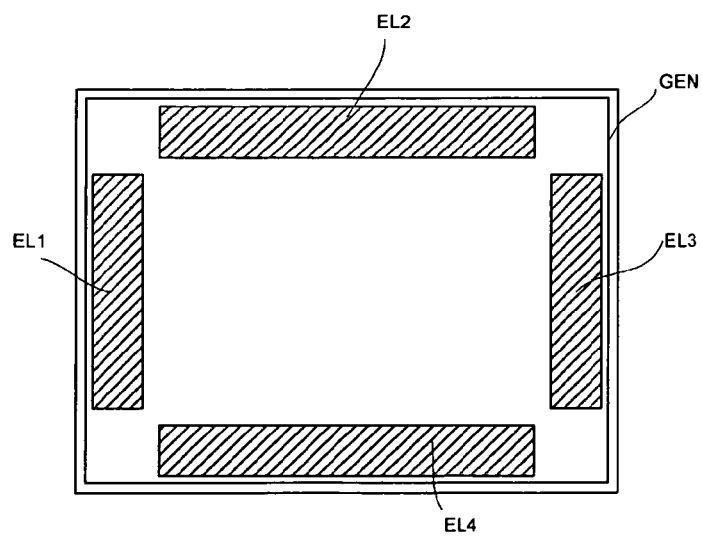
Figure 15:
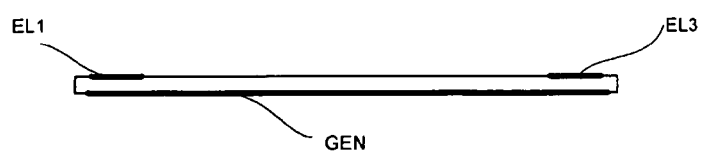
Figure 16:
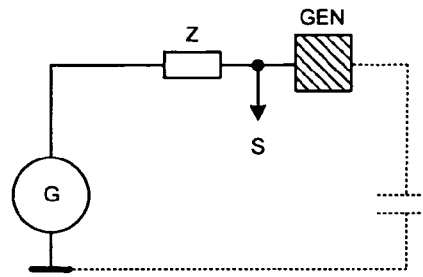

As it can be seen in the FIGS. 15 and 16 it is possible to fit the system according to various embodiments with a carrier electrode, that extends on one lower side of the electrode relative to the detection zone below the electrode group. By means of this carrier electrode a rear shielding can be achieved. The carrier electrode can be connected to the circuit arrangement or another driver circuit, in such a way that this carrier electrode is operated as shielding electrode, for the extensive shielding of the lower side of the electrode group. The carrier electrode can be also used even for the touch detection.

Figure 17:
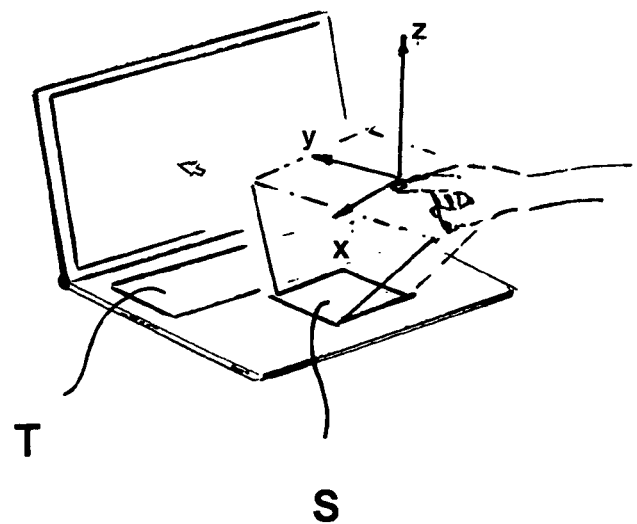
FIGS. 17, 18 and 19 sketches to illustrate the use of the system according to various embodiments in connection with data processors—in the present case note book or desktop computers and projection apparatus.

In FIG. 17 is illustrated a portable computer, that comprises a keyboard T as well as an input system S according to various embodiments. This input system is configured in such a way that it allows the generation of input signals, which correlate as such with manual input operations executed by the user. The input system comprises an electrode group integrated into the touch pad area near the keyboard comprising several plane electrodes adjacent to each other. The input system comprises moreover a circuit arrangement coupled to the electrodes of the electrode group. The electrode group and the circuit arrangement constitute a sensor circuit which both allow a detection of a status to evaluate as a physical contacting of the equipment component, and a position detection of the hand or a finger of a user in a area placed spatially upstream of the equipment component. In the case of a physical contacting occurs a two-dimensional resolution of the finger position. While the finger, as indicated, lies in an observation area situated on the input system takes place a spatial resolution of the finger top position.

Figure 18:
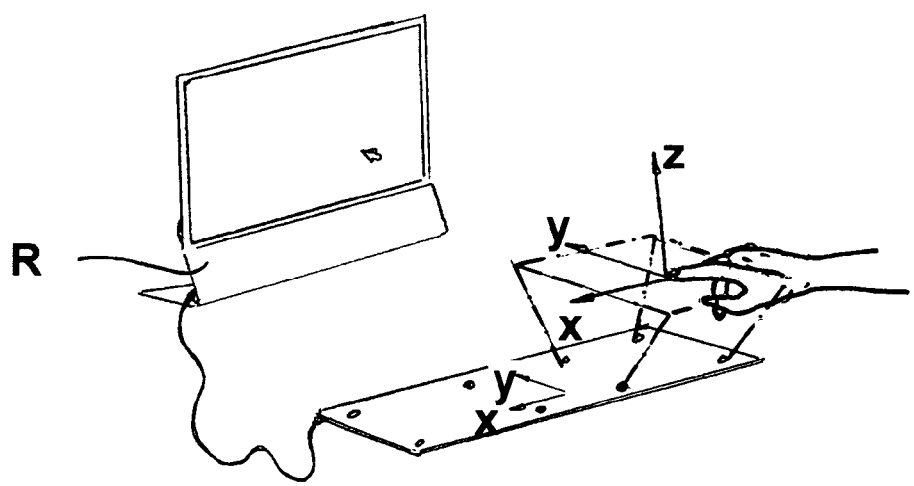

In FIG. 18 is shown a variant of a system according to various embodiments executed as a flat structure and can be coupled by means of electrical signals with a computer system R. In this flat structure of the housing is situated an electrode arrangement, that both allows a spatial position resolution of the finger top position and a two-dimensional position resolution in case of the physical contacting, or—depending on the configuration—from sufficiently narrow approximation. The position detection occurs on the basis of capacitive interaction effects, their dimension correlates in the end with the position of the hand of the user.

Figure 19:
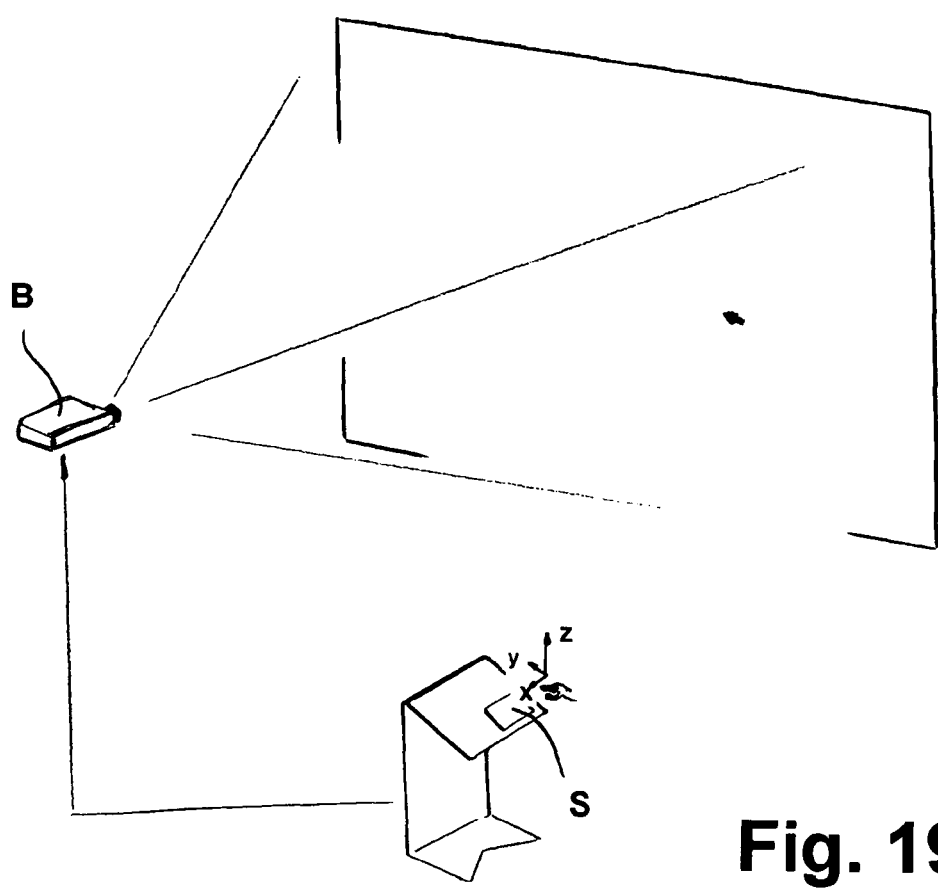

In FIG. 19 is shown the use of the system according to various embodiments in connection with a projection apparatus B. On the speaker's desk, which is recognizable here is situated a system S according to various embodiments that allows a detection of the spatial position of a finger of the speaker and a gesture detection and a cursor control based on this. The system S is configured in such a way, that it changes from the 3D-mode into a touch pad mode with 2D finger position detection in case of physical contacting.

What is claimed is:

1. System for generating input signals correlating with manual input operations executed by a user, comprising:
    an electrode group comprising a generator electrode and a plurality of receiving electrodes integrated into an equipment component, wherein the generator electrode and the plurality of receiving electrodes are formed by flat shaped electrodes and at least a subset of the receiving electrodes are arranged in a plane, and
    a circuit arrangement coupled with the electrodes of the electrode group,
    wherein the electrode group and the circuit arrangement constitute a sensor circuit which allows both, a detection of a proximity status of a hand or a finger of the user to evaluate a physical contacting of the equipment component, and also a detection of a non-touching gesture performed by the hand or the finger of the user in an area which is spatially located in front of the equipment component,
    wherein the circuit arrangement is configured to discriminate between a touch event and a gesture event by evaluating signals received from the receiving electrodes, wherein the circuit arrangement uses a first threshold with respect to a signal amplitude and a second threshold with respect to a derivative of the signal amplitude with time to discriminate the gesture event and the touch event.

2. System according to the claim 1, wherein the non-touching gesture detection primarily is accomplished through the subset of the receiving electrodes contained in the electrode group comprising several subelectrodes spaced apart from each other.

3. System according to claim 2, wherein the electrode group is configured in such a way that the receiving electrodes substantially cover a full surface area serving as touch detection zone surface.

4. System according to claim 3, wherein the electrode group comprises the generator electrode in a plane below the receiving electrodes.

5. System according to claim 1, wherein a total area of the receiving electrodes is smaller than the total area of the generator electrode.

6. System according to claim 1, wherein a detection zone comprises edge zones, and that the subset of the receiving electrodes are arranged in the edge zones.

7. System according to claim 1, wherein the receiving electrodes are arranged in an area covered by the generator electrode.

8. System according to claim 1, wherein the subset of the receiving electrodes comprise four receiving electrodes and the position of the receiving electrodes is fixed so that the surface centres of gravity of the subset of the receiving electrodes represent edges of a rectangle, a rhombus, or a square.

9. System according to claim 1, wherein a generator electrode is provided that is arranged in a same plane as the subset of the receiving electrodes and the receiving electrodes are arranged around a perimeter of the generator electrode.

10. System according to claim 1, wherein the generator electrode is connected to the circuit arrangement, and wherein the generator electrode is operated as a shielding electrode for extensive shielding of a lower part of the receiving electrodes.

11. System according to claim 1, wherein at least one of the receiving electrodes is transparent and designed as an ITO layer electrode.

12. System according to claim 1, wherein the receiving electrodes each have one smaller electrode surface than the generator electrode.

13. System according to claim 1, wherein the receiving electrodes are arranged in an edge zone of a detection zone.

14. System according to claim 1, wherein the receiving electrodes are strip-like electrode structures extending along an edge of a detection zone.

15. System according to claim 1, wherein a detection zone represents a substantially rectangular area, and the receiving electrodes are configured substantially rotation symmetrical in the detection zone.

16. System according to claim 1, wherein the circuit arrangement is configured to determine a non-touching gesture performed by an object form signals received from the subset of receiving electrodes by triangulation.

17. Method for generating input signals correlating with manual input operations executed by a user using an electrode group integrated into an equipment component comprising several plane shaped receiving electrodes and a generator electrode, the method comprising:
    generating an electric field through said generator electrode;
    receiving signals from said receiving electrodes to perform, both a detection of proximity status to evaluate whether a physical contacting of the equipment component occurred and a non-touching gesture detection in an area placed spatially in front of the equipment component, wherein a discrimination between a touch event and a gesture event is performed by evaluating signals received from the receiving electrodes, wherein a first threshold with respect to a signal amplitude and a second threshold with respect to derivative of the signal amplitude with time are used to discriminate the gesture event and the touch event, and wherein gestures detected by the detection are used for controlling a system function.

18. Method according to the claim 17, wherein a detection criterion is a dynamic criterion of an indicative signal contribution relative to the position of a Z-axis.

19. Method according to the claim 17, wherein a detection criterion comprises an observation of a detected position of a Z-axis, and that a contact is detected, when a certain distance to the equipment component appears as to be below.

20. Display device with a system for generating input signals correlating with manual input operations executed by a user, comprising:
- an electrode group comprising a generator electrode and a plurality of receiving electrodes integrated into an equipment component, wherein the generator electrode and the plurality of receiving electrodes are formed by flat shaped electrodes and at least a subset of the receiving electrodes are arranged in a plane, and
- a circuit arrangement coupled with the electrodes of the electrode group, wherein the electrode group and the circuit arrangement constitute a sensor circuit which allows both, a detection of a proximity status of a hand or a finger of the user to evaluate a physical contacting of the equipment component, and also a detection of a non-touching gesture performed by the hand or the finger of the user in an area which is spatially located in front of the equipment component,
- wherein the circuit arrangement is configured to discriminate between a touch event and a gesture event by evaluating signals received from the receiving electrodes, wherein the circuit arrangement uses a first threshold with respect to a signal amplitude and a second threshold with respect to a derivative of the signal amplitude with time to discriminate the gesture event and the touch event,
- wherein a contact in a two-dimensional detection of a movement of the finger and a spatial detection of the finger or the hand of the user is determined, wherein a function of a computer system connected to the display device is coordinated by touch inputs, which are executed in front of the display device by the finger or the hand of the user.

* * * * *